United States Patent
Matsumoto et al.

(10) Patent No.: US 10,179,745 B2
(45) Date of Patent: Jan. 15, 2019

(54) WATER RECOVERY SYSTEM FOR USE IN CONFINED SPACES

(71) Applicant: KURITA WATER INDUSTRIES LTD., Nakano-ku, Tokyo (JP)

(72) Inventors: Yukitaka Matsumoto, Tokyo (JP); Nobuhiro Orita, Tokyo (JP); Hideki Kobayashi, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 669 days.

(21) Appl. No.: 14/760,635

(22) PCT Filed: Oct. 18, 2013

(86) PCT No.: PCT/JP2013/078257
§ 371 (c)(1),
(2) Date: Jul. 13, 2015

(87) PCT Pub. No.: WO2014/115383
PCT Pub. Date: Jul. 31, 2014

(65) Prior Publication Data
US 2015/0353401 A1  Dec. 10, 2015

(30) Foreign Application Priority Data

Jan. 22, 2013 (JP) .................................. 2013-009380

(51) Int. Cl.
*B01D 61/42* (2006.01)
*C02F 1/46* (2006.01)
(Continued)

(52) U.S. Cl.
CPC ............... *C02F 9/00* (2013.01); *B01D 61/44* (2013.01); *B01D 61/58* (2013.01); *C02F 1/42* (2013.01);
(Continued)

(58) Field of Classification Search
None
See application file for complete search history.

(56) References Cited

U.S. PATENT DOCUMENTS 5,310,488 A * 5/1994 Hansen ...................... C02F 1/42
210/674
6,375,827 B1 * 4/2002 Kurosu ................... A61L 2/035
204/263
(Continued)

FOREIGN PATENT DOCUMENTS

JP S54-82367 A 6/1979
JP H10-174976 A 6/1998
(Continued)

OTHER PUBLICATIONS

PCT, "International Search Report for International Application No. PCT/JP2013/078257".
(Continued)

*Primary Examiner* — Krishnan S Menon
(74) *Attorney, Agent, or Firm* — Manabu Kanesaka

(57) ABSTRACT

A water recovery system can treat water in a confined space. The wastewater treatment system includes a cation-exchange device in which water to be treated, such as wastewater originating in a space station, water discharged by the human body, water produced by condensing water vapor contained in the air, is directly introduced to a cation-exchange resin and thereby treated by cation exchange; a diamond-electrode electrolysis device in which organic substances, urea, and other nitrogen compounds contained in water discharged from the cation-exchange device are decomposed; a catalytic decomposition device in which the residual organic component is brought into contact with a catalyst to be decomposed; an electrodialysis device in which water discharged from the catalytic decomposition device is treated by electrodialysis to produce desalted water
(Continued)

as well as an acid and an alkali; and a mineral adding device in which a mineral is added to the desalted water.

7 Claims, 3 Drawing Sheets

(51) Int. Cl.
| | |
|---|---|
| *C02F 1/42* | (2006.01) |
| *C02F 1/72* | (2006.01) |
| *B01D 61/58* | (2006.01) |
| *C02F 9/00* | (2006.01) |
| *C02F 1/467* | (2006.01) |
| *C02F 1/461* | (2006.01) |
| *B01D 61/44* | (2006.01) |
| *C02F 1/469* | (2006.01) |
| *C02F 1/68* | (2006.01) |
| *C25B 1/26* | (2006.01) |
| *C02F 1/20* | (2006.01) |
| *C02F 1/66* | (2006.01) |
| *C02F 101/16* | (2006.01) |
| *C02F 101/38* | (2006.01) |

(52) U.S. Cl.
CPC .......... *C02F 1/4674* (2013.01); *C02F 1/4693* (2013.01); *C02F 1/46109* (2013.01); *C02F 1/68* (2013.01); *C25B 1/26* (2013.01); *C02F 1/20* (2013.01); *C02F 1/4618* (2013.01); *C02F 1/4672* (2013.01); *C02F 1/66* (2013.01); *C02F 1/725* (2013.01); *C02F 2001/425* (2013.01); *C02F 2001/46133* (2013.01); *C02F 2001/46147* (2013.01); *C02F 2101/16* (2013.01); *C02F 2101/38* (2013.01); *C02F 2201/001* (2013.01); *C02F 2201/46115* (2013.01); *C02F 2303/16* (2013.01); *C02F 2303/22* (2013.01)

(56) References Cited

U.S. PATENT DOCUMENTS

| | | | | |
|---|---|---|---|---|
| 2008/0105624 | A1 | 5/2008 | Wormcke | |
| 2013/0126353 | A1* | 5/2013 | Perez | C02F 1/42 |
| | | | | 204/520 |
| 2013/0168262 | A1* | 7/2013 | Reyter | C02F 1/4674 |
| | | | | 205/743 |

FOREIGN PATENT DOCUMENTS

| | | |
|---|---|---|
| JP | 2001-275562 A | 10/2001 |
| JP | 2004-121959 A | 4/2004 |
| JP | 2006-095526 A | 4/2006 |
| JP | 2006-167648 A | 6/2006 |
| JP | 2007-098272 A | 4/2007 |
| JP | 2007-332537 A | 12/2007 |
| JP | 2010-119963 A | 6/2010 |
| JP | 2010-119964 A | 6/2010 |
| JP | 2012-130891 A | 7/2012 |
| JP | 2013-075259 A | 4/2013 |
| RU | 2088317 C1 | 8/1997 |
| RU | 2386591 C2 | 4/2010 |
| RU | 2009147974 A | 6/2011 |
| SU | 1474097 A1 | 4/1989 |
| SU | 1597206 A1 | 10/1990 |

OTHER PUBLICATIONS

Europe Patent Office, "Search Report for European Patent Application No. 13872948.8," dated Aug. 3, 2016.

Akse, J. et al, "SAE Technical Paper Series: Development and Fabrication of a Breadboard Electrochemical Water Recovery System," The Engineering Society for Advancing Mobility Land Sea Air and Space, Jul. 12, 1993, p. 2-16, Retrieved from the Internet: URL: http://www.urc.cc/pubs/URC-1993a.pdf [retrieved on Jul. 27, 2016].

Mitchell, J. et al., "Ion Exchange Technology Development in Support of the Urine Processor Assembly Precipitation Prevention Project for the International Space Station," 42nd International Conference on Environmental Systems, Jul. 15, 2012.

Nicolau, E et al., "Bioelectrochemical degradation of urea at platinized boron doped diamond electrodes for pioregenerative systems," Advances in Space Research, Oct. 15, 2009, p. 965-970, vol. 44, No. 8, Elsevier Ltd.

Russia Patent Office, "Office Action for Russian Patent Application No. 2015135392," dated Oct. 11, 2017.

Serebryakov V.N., Basics of designing life-support systems of crew of spacecraft, "Engineering" Publisher, 1983, p. 90-94.

* cited by examiner

WATER RECOVERY SYSTEM FOR USE IN CONFINED SPACES

FIELD OF INVENTION

The present invention relates to a water recovery system used for recovering water by treating wastewater such as urine and domestic wastewater originating in confined spaces. The present invention particularly relates to the water recovery system that is suitable for use in confined spaces such as a nuclear shelter, a disaster evacuation center, a space station, manned spacecraft for the lunar or mars mission, and a lunar base.

BACKGROUND OF INVENTION

Japanese patent publication 2006-095526A discloses a method in which water is recovered from wastewater originating in a confined space by pervaporation. However, wastewater such as urine and domestic wastewater usually contains volatile components such as ammonia, and the volatile components may be disadvantageously mixed in the recovered water. Furthermore, when the wastewater contains a hardness component, scale trouble is caused on a pervaporation membrane. When the wastewater contains an organic substance such as protein, fouling may occur, which deteriorates membrane distillation capability. In addition, pervaporation requires high energy consumption.

Japanese Patent Publication 2010-119963A discloses a method in which wastewater originating in a confined space is subjected to a biological treatment, membrane separation, and subsequently distillation or freezing in order to recover water. However, in a biological treatment, microorganisms are likely to be inactivated when operating conditions thereof deviate from the norm. Inactivated microorganisms are not reactivated again. Moreover, in an activated sludge process, one third to half the organic substance is removed in the form of sludge. That is, an activated sludge process produces sludge containing precious water as a waste substance.

LIST OF PATENT LITERATURE

Patent Literature 1: Japanese Patent Publication 2006-095526 A
Patent Literature 2: Japanese Patent Publication 2010-119963 A

SUMMARY OF INVENTION

An object of the present invention is to provide a water recovery system for use in a confined space which is capable of addressing the above-described problems and recovering water consistently with high water recovery and low energy consumption.

A water recovery system for use in a confined space according to the present invention includes a cation-exchange device in which wastewater originating in a confined space is treated by cation exchange with a cation-exchange resin; an organic-component decomposing device in which an organic component contained in water discharged from the cation-exchange device is decomposed; and an electrodialysis device in which water discharged from the organic-component decomposing device is treated by electrodialysis.

The water recovery system preferably further includes a regeneration unit in which the cation-exchange resin is regenerated using an acid or using an acid and an alkali that are produced in the electrodialysis device.

The cation-exchange resin is preferably a Na-type weakly acidic cation-exchange resin.

The organic-component decomposing device may be a diamond-electrode electrolysis device including conductive diamond serving as an electrode. There are some organic substances such as urea and bilirubin, which has low degradability, that cannot be decomposed using an electrolysis device including a general-industrial-electrolysis-purpose electrode such as a platinum electrode. However, use of the diamond-electrode electrolysis device enables urea and bilirubin, which has low degradability, to be decomposed.

In the system according to the present invention, the organic-component decomposing device may include a diamond-electrode electrolysis device and a catalytic decomposition device.

The system according to the present invention may further include a mineral adding unit in which a mineral component is added to the treated water discharged from the electrodialysis device.

ADVANTAGEOUS EFFECTS OF INVENTION

In the present invention, wastewater originating in a confined space is treated by cation exchange in a cation-exchange resin device. As a result, hardness components are removed, which eliminates (or reduces) the risk of malfunctions of the subsequent devices which may be caused by scale.

The resulting water, from which the hardness components have been removed, is then treated in an organic-component decomposing device to decompose organic substances, urea, bilirubin, and other nitrogen compounds.

An electrolysis device including a conductive diamond electrode may be used as a device for decomposing the organic components. Using hypochlorous acid produced by electrolysis performed in such an electrolysis device, organic substances such as protein, urea, and bilirubin can be decomposed in the catalytic decomposition device into ions such as an organic acid and ammonia which can be removed in the subsequent electrodialysis device. Thorough the electrolysis process using a diamond electrode, part of ammonia is decomposed into $N_2$ gas.

The organic acid, ammonia, inorganic ions, and the like produced by the decomposition treatment are separated in the electrodialysis device. A three-compartment electrodialysis device is suitably used as the electrodialysis device. The three-compartment electrodialysis device includes an anode; a cathode; and an acid compartment, an anion-exchange membrane, a desalting compartment, a cation-exchange membrane, a bipolar membrane, an acid compartment, an anion-exchange membrane, a desalting compartment, and a cation-exchange membrane, which are repeatedly disposed in order between the anode and the cathode. An acid produced in this device can be used for regenerating the cation-exchange resin.

Water suitable for drinking may be produced by adding minerals to water that has been subjected to the above-described treatments.

DESCRIPTION OF EMBODIMENTS

Hereafter, the present invention is described in detail with reference to the attached drawings.

Figure 1:
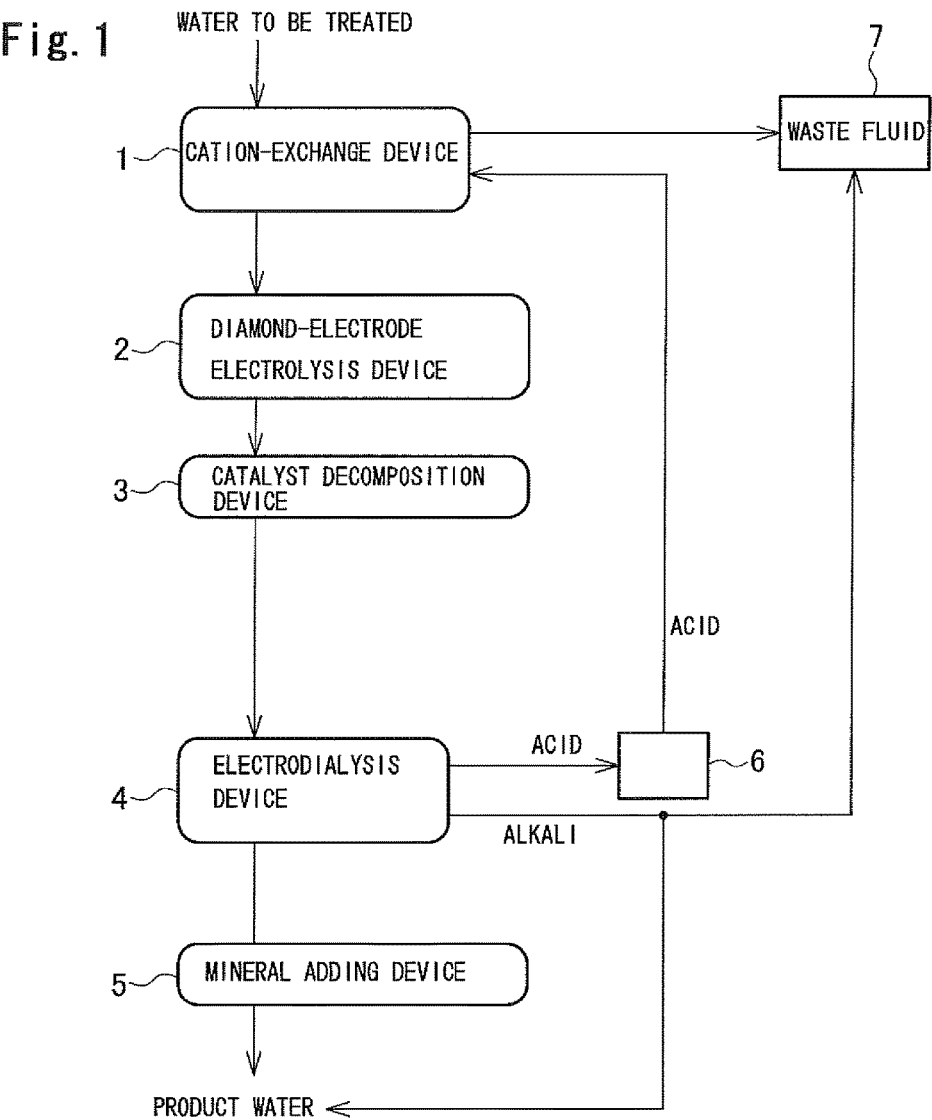
FIG. 1 is a block diagram of a water recovery system according to an embodiment of the present invention.

FIG. 1 is a block diagram of a wastewater treatment system for use in confined spaces according to an embodiment of the present invention.

The wastewater treatment system includes a cation-exchange device 1 in which water to be treated, such as wastewater originating in a space station or the like, water discharged by the human body, water produced by condensing water vapor contained in the air, is directly treated by cation exchange; a diamond-electrode electrolysis device 2 in which organic substances, urea, and other nitrogen compounds contained in the water discharged from the cation-exchange device 1 are decomposed; a catalytic decomposition device 3 in which the residual organic component is brought into contact with a catalyst to be decomposed; an electrodialysis device 4 in which water discharged from the catalytic decomposition device 3 is treated by electrodialysis to produce desalted water as well as an acid and an alkali; and a mineral adding device 5 in which a mineral is added to the desalted water.

In this embodiment, a Na-type weakly acidic cation-exchange resin is used as a cation-exchange resin included in the cation-exchange device 1. The Na-type weakly acidic cation-exchange resin has a larger cation-exchange capacity than strongly acidic cation-exchange resins. The Na-type weakly acidic cation-exchange resin has larger $Ca^{2+}$ and $Mg^{2+}$ exchange capacities than an H-type weakly acidic cation-exchange resin.

In this embodiment, the hardness components are removed in the cation-exchange device 1, which prevents the ion-exchange membrane in the electrodialysis device 4 from being clogged. Organic substances such as protein, which may cause fouling of the ion-exchange membrane to occur, can be decomposed in the diamond-electrode electrolysis device 2 and the catalytic decomposition device 3.

The acid produced in the electrodialysis device 4 is stored in a tank 6. The acid stored in the tank 6 is supplied to the cation-exchange device 1 when the cation-exchange resin included in the cation-exchange device 1 is regenerated and used for regenerating the cation-exchange resin. The waste fluid resulting from regeneration is introduced to a waste fluid tank 7. In this embodiment, the acid produced in the electrodialysis device 4 is used for regenerating the cation-exchange resin, which eliminates the need for an exclusive acid source.

Although it is impossible to remove urea in the electrodialysis device 4, in this embodiment, urea is decomposed into ammonia and carbonic acid in the diamond-electrode electrolysis device 2 and the catalytic decomposition device 3. This prevents urea from leaking into the treated water.

The details of the reaction mechanism in which impurities are removed in this embodiment are as follows.

In the cation-exchange device 1, $Ca^{2+}$, $Mg^{2+}$, and some monovalent cations are removed by a cation-exchange reaction with a Na-type weakly acidic cation-exchange resin.

The following softening reaction (i.e., hardness-component-removal reaction) occurs due to ion exchange.

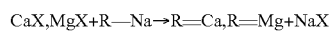

where,
R—: Exchange group of ion exchange resin

In the diamond-electrode electrolysis and the catalyst decomposition, the organic substances and urea are decomposed by the following reactions.

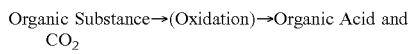

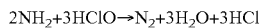

Examples of the catalyst that can be included in the catalytic decomposition device 3 include, but are not limited to, Pt, Ru, Ni, and Co. It is suitable to operate the catalytic decomposition device 3 at the normal temperature to about 350° C.

The following reaction occurs in the electrodialysis device.

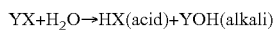

Figure 3:
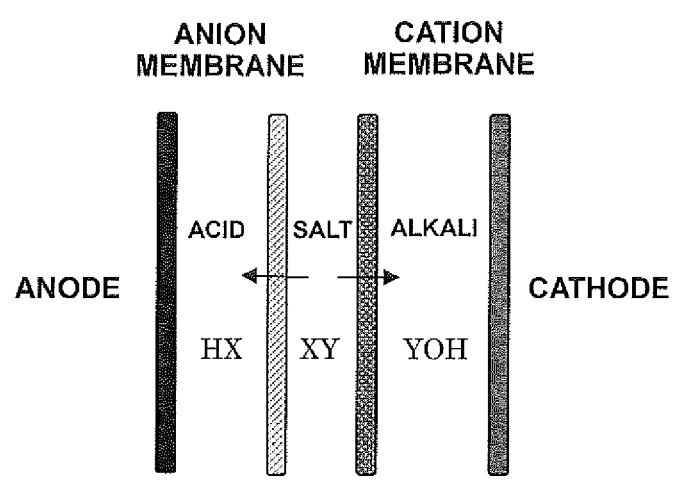
FIG. 3 is a schematic cross-sectional view of an electrodialysis device.

FIG. 3 schematically illustrates a reaction that occurs in the three-compartment electrodialysis device. The three-compartment electrodialysis device includes an anode; and a cathode; and an acid compartment, an anion-exchange membrane, a desalting compartment, a cation-exchange membrane, a bipolar membrane, an acid compartment, an anion-exchange membrane, a desalting compartment, and a cation-exchange membrane, which are repeatedly disposed in order between the anode and the cathode. As illustrated in FIG. 3, the anion X and the cation Y contained in water to be treated permeate through the anion membrane and the cation membrane to migrate into the anode compartment and the cathode compartment, respectively. Thus, a desalted water is produced. As described above, the acid solution produced by electrodialysis is used as an agent for regenerating the cation-exchange resin. The alkaline solution produced by electrodialysis is discharged into the waste fluid tank 7. Alternatively, part of the alkaline solution may be added to the product water for controlling pH. The waste fluid stored in the waste fluid tank 7 may be mixed with other wastewater as needed and reused as water to be treated.

Figure 2:
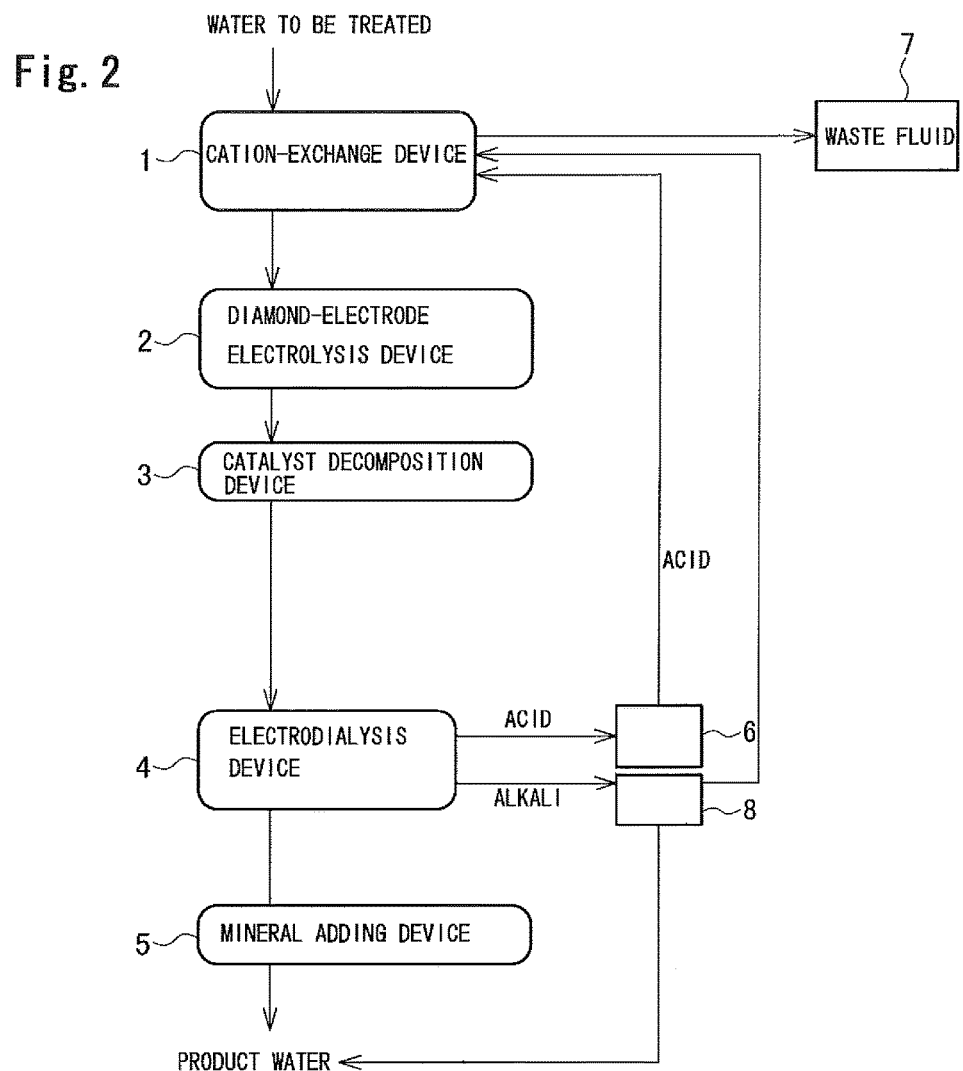
FIG. 2 is a block diagram of a water recovery system according to another embodiment of the present invention.

Although the alkaline solution produced by electrodialysis is discharged into the waste fluid tank 7 in FIG. 1, alternatively, the alkaline solution may be stored in a tank 8 and used as an agent for regenerating the cation-exchange resin as illustrated in FIG. 2. In the case where the cation-exchange resin is regenerated into a Na-type cation-exchange resin, regeneration is performed using an acid and subsequently using an alkali. Part of the alkaline solution may be added to the product water for controlling pH. The other components illustrated in FIG. 2 are the same as those illustrated in FIG. 1, and the corresponding parts are designated by the same reference numerals.

Gases such as hydrogen, oxygen, and chlorine are generated in the above-described diamond-electrode electrolysis device, catalytic decomposition device, electrodialysis device, and the like due to chemical reactions. It is preferable to perform gas-liquid separation as needed by, for example, using a degassing membrane or centrifugal separation.

In the embodiments illustrated in FIGS. 1 and 2, desalted water discharged from the electrodialysis device 4 is passed through the mineral adding device 5 in order to add minerals to the desalted water and control the pH of the desalted water to be neutral. It is suitable to use a mineral adding device including a layer filled with a natural stone containing calcium carbonate, such as corallite, through which water can be passed.

The water recovery systems illustrated in FIGS. 1 and 2, which have a simple structure, are capable of removing impurities from domestic wastewater or water discharged by the human body and therefore can be suitably used as a life-supporting system for use in confined spaces such as a space station.

In a confined space, the major sources of water to be treated are urine, water vapor contained in the air, and domestic wastewater. Since they have different water qualities, two or more kinds of the wastewater originating from a different source may be treated separately by the water recovery system of the present invention. Alternatively, two or more kinds of the wastewater may be mixed together and then treated. It is also possible to merge a specific type of water to be treated with water being treated during the treatment process. It is desirable to select from the above-described treatment methods in consideration with treatment efficiency.

In general, urine contains the largest amount of scale component among the above-described wastewater to be treated. Therefore, only urine may be subjected to a hardness-component-removal treatment performed in the cation-exchange device 1, and condensed water produced by condensing water vapor contained in the air may merge into the water from the device 1 prior to the organic-component decomposition step. This increases treatment efficiency without increasing the amount of water to be treated in each step.

EXAMPLES

Urine was experimentally treated in accordance with a treatment flow using the system of the present invention. As described above, urine is a representative example of the water to be treated which may originate in a confined space. Table 1 shows a major ion composition of the urine.

TABLE 1

|  | Ion species | Concentration mg/L | Concentration meq/L |
|---|---|---|---|
| Cation | $NH_3$ | 572 | 34 |
|  | $Na^+$ | 3146 | 137 |
|  | $Ca_2^+$ | 8 | 0.4 |
|  | $Mg_2^+$ | 199 | 16 |
|  | $K^+$ | 1752 | 45 |
|  | Total cation |  | 232 |
| Anion | $Cl^-$ | 5645 | 159 |
|  | $NO_3^-$ | 586 | 9.5 |
|  | $SO_4^{2-}$ | 2076 | 43 |
|  | $PO_4^{3-}$ | 374 | 3.9 |
|  | Total anion |  | 212 |

[1] Cation-Exchange Treatment

One liter of the urine described above was passed through 50 mL of a Na-type weakly acidic cation-exchange resin (C104E produced by Purolite Corporation). As a result, all the hardness components and part of $NH_3$ and $K^+$ were removed from the water treated by the Na-type cation resin. The concentrations of the residual $NH_3$ and $K^+$ were 520 mg/L and 1740 mg/L, respectively. The TOC of the water treated with the cation-exchange resin was 7600 mg/L.

[2] Test of Decomposing Organic Substances by Diamond-Electrode Electrolysis Device Subsequently, 200 mL of the above-described water treated by the cation-exchange resin was treated by electrolysis using an electrolysis device including a 5-cm square diamond electrode at a circulation flow rate of 1.7 L/min. Electrolysis was performed at a constant current of 2.5 A for 100 hours. The voltage varied from 10 V to 5 V. A 20 mmφ×500 mmH acrylic column filled with a catalyst was incorporated into the circulatory system. The catalyst was a Ti—Pt catalyst produced by N.E. CHEMCAT Corporation. After 100 hours, the TOC of the electrolysis circulation water was 1 mg/L or less.

[3] Desalting and Production of Acid and Alkali Using Electrodialysis Device

An electrodialysis device prepared by modifying ACI-LYZER S3 produced by ASTOM Corporation was used in the test. The cell used was constituted by an anode, an electrode compartment, a bipolar membrane, an acid compartment, an anion-exchange membrane, a desalting compartment, a cation-exchange membrane, an alkaline compartment, a bipolar membrane, an electrode compartment, and a cathode. The electrode solution used was a 0.5 mol/L sodium sulfate solution.

Electrolysis was performed at a constant current of 2.2 A. Circulation of the water treated with the diamond electrode was performed at a flow rate of 50 mL/min. The voltage varied from 10 V to 30 V.

Through each of the acid compartment and the alkaline compartment, 50 mL of pure water was separately circulated at a flow rate of 10 mL/min. After 8 hours, the concentration in the water circulated through the acid compartment was about 1 N, at which the circulated water was capable of being used for regenerating the cation resin. Table 2 summarizes the quality of the desalted water which was determined after the 8-hour circulation period. In Table 2, the term "Standard" refers to a standard value of tap water.

TABLE 2

| Item | $Na^+$ | $NH_4^+$ | $K^+$ | $Mg^{2+}$ | $Ca^{2+}$ | $Cl^-$ | $NO_2^-$ | $NO_3^-$ | $SO_4^{2-}$ | $PO_4^{2-}$ |
|---|---|---|---|---|---|---|---|---|---|---|
| Measured value (mg/L) | 6.2 | 0.1 | 0.7 | <0.1 | 0.1 | 0.2 | 2.1 | 3.8 | 11.3 | 7.9 |
| Standard (mg/L) | 200 | — | — | 300[*1] | 300[*1] | 200 | 10[*2] | 10[*2] | — | — |

[*1]As calcium, magnesium, or the like
[*2]As nitrate nitrogen or nitrite nitrogen As shown in Table 2, each ion concentration satisfied the tap water standard, and the water quality was suitable for drinking purpose.

INDUSTRIAL APPLICABILITY

According to the present invention, reuse of water, which is vital to human life, may be achieved without concerns about clogging due to scale, fouling due to organic substances, and the like or consuming a large amount of energy as in evaporation. This enables humans to stay in a confined space such as a nuclear shelter or the space for a prolonged period of time.

While details of the present invention are described with reference to specific embodiments, it is apparent to those skilled in the art that various modifications can be made without departing from the spirit and the scope of the present invention.

This application is based on Japanese Patent Application (Japanese Patent Application No. 2013-009380) filed Jan. 22, 2013, which is hereby incorporated by reference herein in its entirety.

The invention claimed is:

1. A water recovery system in a confined space, comprising:
    a cation-exchange device in which wastewater originating in a confined space is treated by cation exchange with a Na-type weakly acidic cation-exchange resin;
    an organic-component decomposing device in which an organic component contained in water discharged from the cation-exchange device is decomposed, comprising a diamond-electrode electrolysis device including conductive diamond serving as an electrode, and a catalytic decomposition device;
    an electrodialysis device in which water discharged from the organic-component decomposing device is treated by electrodialysis, thereby producing an acid and an alkali;
    a regeneration unit in which the cation-exchange resin is regenerated using the acid and the alkali produced in the electrodialysis device;
    a mineral adding unit in which a mineral component is added to a treated water discharged from the electrodialysis device;
    a first tank that stores the acid and supplies the acid to the cation-exchange device to regenerate the cation-exchange resin; and
    a second tank that stores the alkali and supplies the alkali to the cation-exchange device to regenerate the cation-exchange resin.

2. The water recovery system according to claim 1, wherein the wastewater is urine, which is treated by the cation-exchange device, and
    condensed water produced by condensing water vapor contained in air in the confined space is merged into the water from the cation-exchange device prior to the organic component is decomposed.

3. The water recovery system according to claim 1, wherein electrodialysis device comprises
    an anode,
    a cathode, and
    an acid compartment, an anion-exchange membrane, a desalting compartment, a cation-exchange membrane, a bipolar membrane, another acid compartment, another anion-exchange membrane, another desalting compartment, and another cation-exchange membrane disposed in order between the anode and the cathode.

4. A combination, comprising:
    a confined space; and
    a water recovery system in the confined space,
    wherein the water recovery system comprises
        a cation-exchange device in which wastewater originating in the confined space is treated by cation exchange with a Na-type weakly acidic cation-exchange resin;
        an organic-component decomposing device in which an organic component contained in water discharged from the cation-exchange device is decomposed, comprising a diamond-electrode electrolysis device including conductive diamond serving as an electrode, and a catalytic decomposition device;
        an electrodialysis device in which water discharged from the organic-component decomposing device is treated by electrodialysis, thereby producing an acid and an alkali;
        a regeneration unit in which the cation-exchange resin is regenerated using the acid and the alkali produced in the electrodialysis device;
        a mineral adding unit in which a mineral component is added to a treated water discharged from the electrodialysis device;
        a first tank that stores the acid and supplies the acid to the cation-exchange device to regenerate the cation-exchange resin; and
        a second tank that stores the alkali and supplies the alkali to the cation-exchange device to regenerate the cation-exchange resin.

5. The combination according to claim 4, wherein the wastewater is urine, which is treated by the cation-exchange device, and
    condensed water produced by condensing water vapor contained in air in the confined space is merged into the water from the cation-exchange device prior to the organic component is decomposed.

6. The water recovery system according to claim 1, wherein the alkali is supplied to the cation-exchange device after the acid is supplied and used for regeneration of the cation-exchange resin.

7. The combination according to claim 4, wherein the alkali is supplied to the cation-exchange device after the acid is supplied and used for regeneration of the cation-exchange resin.

* * * * *